United States Patent
Kalandek et al.

(10) Patent No.: US 7,044,500 B2
(45) Date of Patent: May 16, 2006

(54) SIDE IMPACT OR CURTAIN AIR BAG WITH POSITION ENHANCING OR LOCATING MECHANISM

(75) Inventors: Bruce A. Kalandek, Dearborn, MI (US); Pongdet P. Wipasuramonton, Rochester, MI (US); Philip J. Macy, Clarkston, MI (US); Jovica J. Jakovski, Warren, MI (US); Mark O. Olson, Farmington Hills, MI (US); Michael A. Hague, Troy, MI (US); Shakir M. Salmo, Sterling Heights, MI (US); John C. MacLean, Brown City, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 19 days.

(21) Appl. No.: 10/021,470

(22) Filed: Oct. 30, 2001

(65) Prior Publication Data
US 2003/0080541 A1   May 1, 2003

(51) Int. Cl.
*B60R 21/22* (2006.01)
*B60R 21/16* (2006.01)
(52) U.S. Cl. .................................. 280/730.2
(58) Field of Classification Search ............ 280/730.2, 280/743.2, 749, 728.1
See application file for complete search history.

(56) References Cited

U.S. PATENT DOCUMENTS

| | | | |
|---|---|---|---|
| 5,924,723 A * | 7/1999 | Brantman et al. | 280/730.2 |
| 6,412,810 B1 * | 7/2002 | Wipasuramonton et al. | 280/730.2 |
| 6,454,296 B1 * | 9/2002 | Tesch et al. | 280/730.2 |
| 6,474,681 B1 * | 11/2002 | Peer et al. | 280/730.2 |
| 6,896,288 B1 * | 5/2005 | Tanaka et al. | 280/743.2 |
| 2004/0012174 A1 * | 1/2004 | Tanaka et al. | 280/730.2 |
| 2005/0046159 A1 * | 3/2005 | Noguchi et al. | 280/730.2 |
| 2005/0104345 A1 * | 5/2005 | Noguchi | 280/730.2 |
| 2005/0116450 A1 * | 6/2005 | Noguchi | 280/730.2 |

FOREIGN PATENT DOCUMENTS

| | | | |
|---|---|---|---|
| DE | 4307175 A1 * | 9/1993 | |
| EP | 0955213 A1 * | 11/1999 | |
| EP | 1260414 A2 * | 11/2002 | |
| EP | 1384632 A1 * | 1/2004 | |
| JP | 6227340 A * | 8/1994 | |
| JP | 40622734 | 8/1994 | |
| KR | 2002031539 A * | 5/2002 | |

* cited by examiner

*Primary Examiner*—Paul N. Dickson
*Assistant Examiner*—Joselynn Y. Sliteris
(74) *Attorney, Agent, or Firm*—Markell Seitzman

(57) ABSTRACT

A side impact air bag curtain apparatus comprising: an inflatable air bag adapted to be installed within a vehicle in a stowed condition proximate the roof rail of a vehicle and when inflated expands from the stowed condition to a deployed condition generally in front of an adjacent side of the vehicle; the air bag including a set of first air bag anchors fixedly connected to a determinable set of fixed first vehicle anchors within the vehicle, the air bag including at least one second air bag anchor at an end of the air bag; and a force-resolving member such as a bent rod or other member fixedly mounted at a determinable orientation within the vehicle and adapted to slidingly receive and support the second air bag anchor. The force-resolving member in concert with the foreshortening of the air bag during inflation causing the second air bag anchor to move to a preferred orientation.

8 Claims, 7 Drawing Sheets

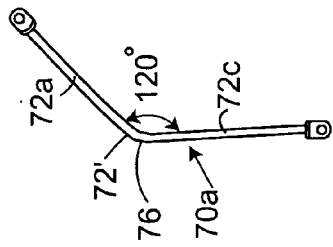
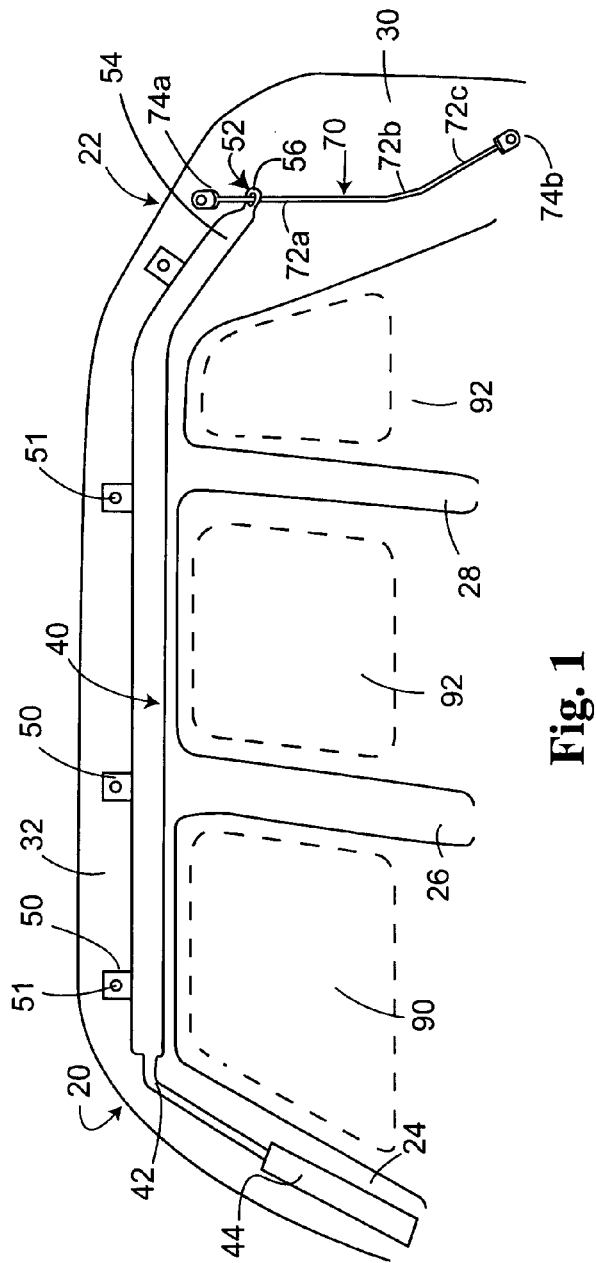
Fig. 1c
Fig. 1

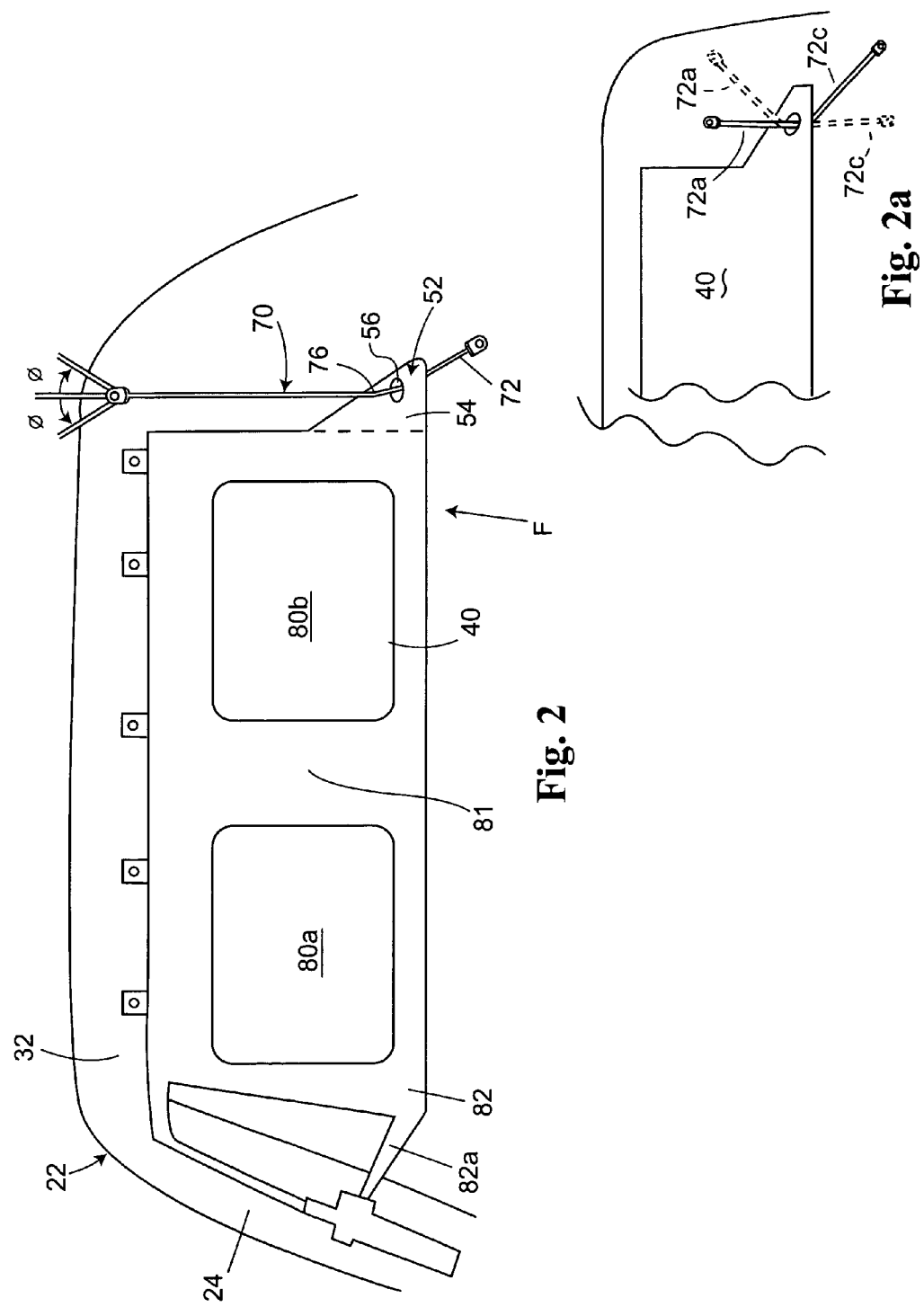

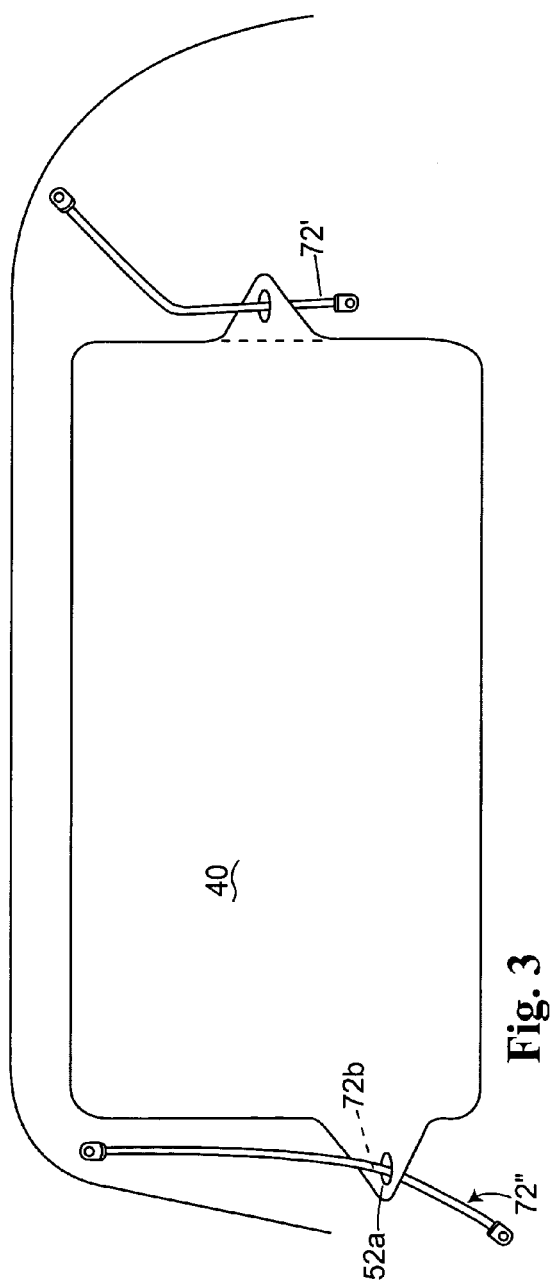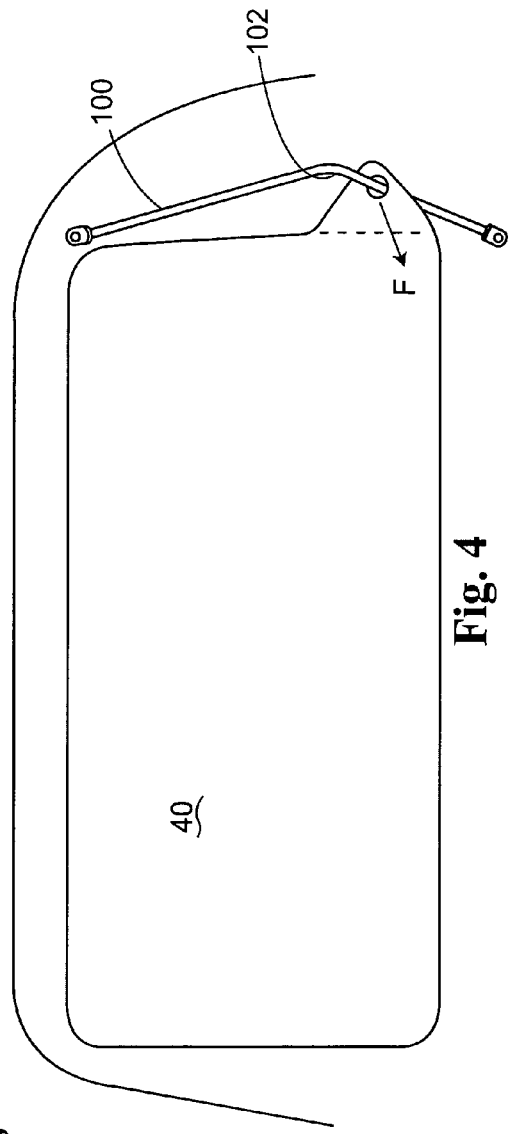

SIDE IMPACT OR CURTAIN AIR BAG WITH POSITION ENHANCING OR LOCATING MECHANISM

BACKGROUND AND SUMMARY OF THE INVENTION

The present invention generally relates to side impact and rollover air bags.

A variety of side impact air bags have been proposed. One class of these air bags is stored proximate the roof rail of the vehicle in a compact, folded condition and when deployed, extends down, generally parallel to the side of the vehicle, the door of the vehicle, or the window area of the vehicle to provide a cushioned barrier between the occupant and this side of the vehicle. The prior art shows these curtain type air bags spanning, one, two, and perhaps three pillars between the A and D-pillars of the vehicle. The air bag is inflated by a source of inflation gas such as an inflator communicated to an inlet of the air bag. The inflator can be positioned at any convenient location within the vehicle, such as adjacent to the A, B, C, and/or D-pillar or in the roof rail and appropriately covered by trim or molding and can be directly connected to the air bag or through a fill tube or passage.

In the context of a side impact accident, the forces generated during the accident are generally horizontal and, consequently, the protected occupant moves laterally (and rolls slightly) into the air bag and about the vehicle. Consequently, any reaction forces on the air bag tend to be generally horizontal in nature. However, in the case of a rollover accident, there may be situations in which the occupant reacts against the air bag in a manner that would tend to lift the air bag from its deployed condition toward the roof rail. To prevent this upward motion, the prior art has devised means to lock a portion or portions of the inflated curtain side impact air bag in place. One of the detriments of those systems that lock or latch the air bags in place is that, after the accident, it is more difficult for the occupant to lift the now-deflated curtain air bag upwardly and easily egress from the vehicle.

It is an object of the present invention to provide an improved air bag that seeks a preferred orientation during inflation, wherein such preferred orientation provides a self-centering or self-inhibiting mechanism that resists the tendency of the air bag to be pushed or lifted, by the occupant, toward the roof rail.

It is a further object of the present invention to provide a system in which subsequent to the accident a protected occupant can easily move the air bag out of the way.

Accordingly the invention comprises: a side impact air bag curtain apparatus comprising: an inflatable air bag adapted to be installed within a vehicle in a stowed condition proximate the roof rail of a vehicle and when inflated expands from the stowed condition to a deployed condition generally in front of an adjacent side of the vehicle; the air bag including a set of first air bag anchors fixedly connected to a determinable set of fixed first vehicle anchors within the vehicle, the air bag including at least one second air bag anchor at an end of the air bag; and an external tether guide or force-resolving member such as a bent rod or other member fixedly mounted at a determinable orientation within the vehicle and adapted to slidingly receive and support the second air bag anchor (which, as seen, can be part of a tether or tether mechanism). Upon inflation of the air bag, the air bag moves to the deployed condition causing the second anchor to slide down the guide or force-resolving member so that upon inflation of the air bag, the second air bag anchor is self located in or near the apex of the bent member, resisting any tendency of the curtain to move or be moved upwardly. The external tether guide or force-resolving member, in concert with the foreshortening of the air bag during inflation, causes the second air bag anchor to move to a preferred, self-guided orientation.

Many other objects and purposes of the invention will be clear from the following detailed description of the drawings.

BRIEF DESCRIPTION OF THE DRAWINGS

FIG. 1 shows a side impact rollover curtain air bag system incorporating the present invention with the air bag in a stowed position.

FIGS. 1c and 1d show other embodiments of the invention.

FIG. 2 shows the system of FIG. 1 with the air bag in an inflated position.

FIG. 2a shows an alternate embodiment of the system.

FIG. 3 shows an alternative embodiment of the invention.

FIG. 4 shows an alternate embodiment.

DETAILED DESCRIPTION OF THE DRAWINGS

Figures 1A, 1B:
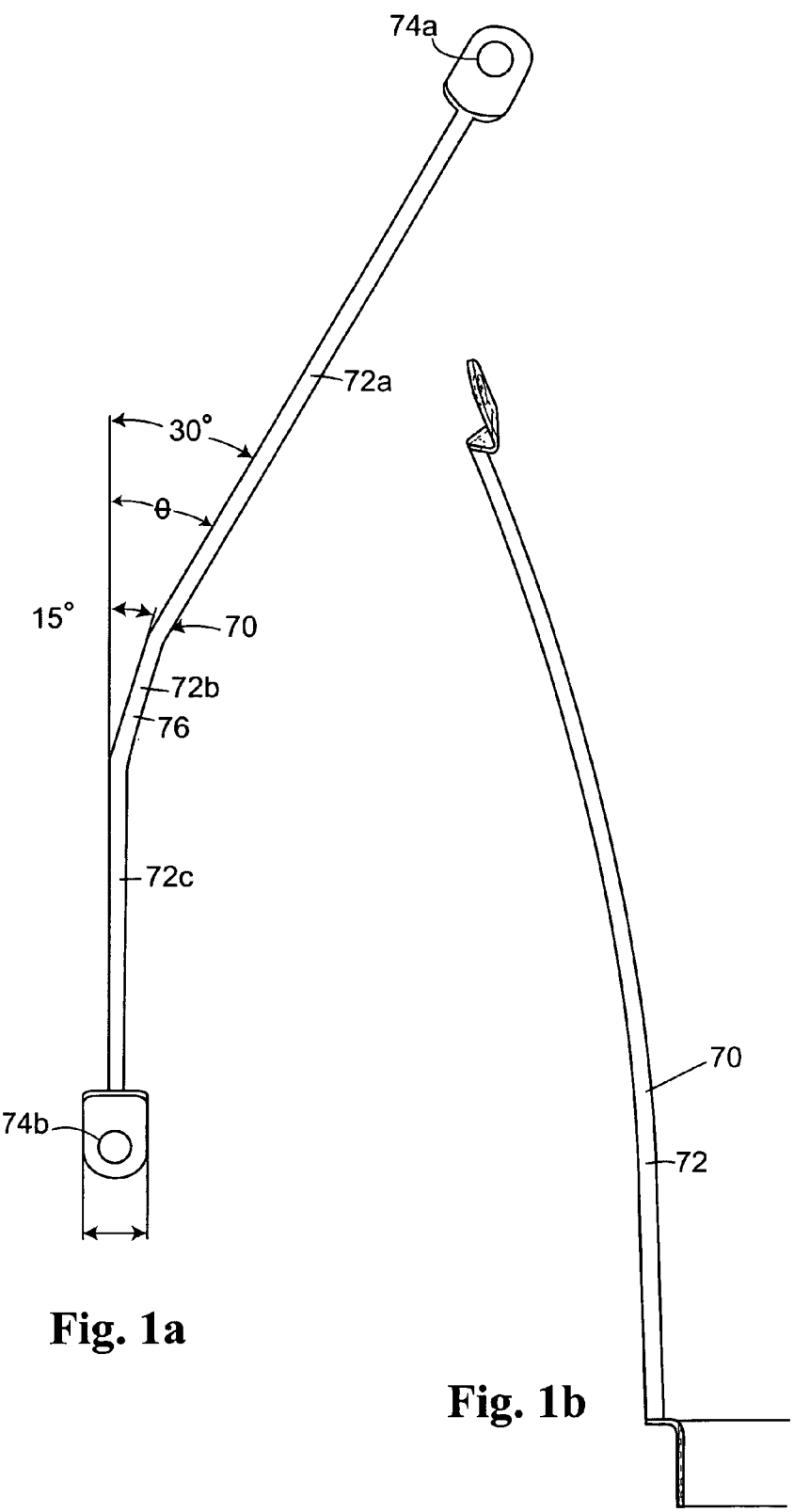
FIG. 1a is an enlarged plan view of an anchor bar.
FIG. 1b is a side view of an anchor bar.

Reference is made to FIG. 1, which illustrates a side impact, rollover occupant protection system 20 for use within a vehicle 22 having two or more support pillars, for example support pillars A, B (and/or C and D), designated by numerals 24, 26, 28 and 30. The vehicle 22 includes a roof rail 32 (and other elements not illustrated). The system 20 includes a side curtain/rollover air bag 40, which has one or more inflatable and connected chambers (see FIG. 2) and an inlet 42 connected to a source of inflation gas 44, such as an air bag inflator. The inflator 44 is shown mounted on the A-pillar 24, however, this inflator 44 can be located at a convenient location close to or remote from the air bag 40. The air bag includes a plurality of anchors such as 50. As shown in FIG. 1, the air bag includes a plurality of reinforced openings, which permit the air bag to be mounted proximate the roof rail 32. The reinforced openings can, for example, be formed by multi-layers of material or by metal or plastic rings. For example, the anchors 50 can receive a co-acting set of vehicle anchors 51, which may comprise hooks extending from the vehicle or alternatively, threaded fasteners, which extend through each anchor 50, to mount the air bag 40 to the vehicle 22. The air bag 40 includes a moving anchor 52, which is formed in a non-inflatable section of material 54. As can be seen in FIG. 2, the movable anchor is formed by a triangular section of material and resembles a sail and which functions as a tether that is external to the inflatable portions of the air bag. The movable anchor can be part of an external tether formed by, for example, a length of seat belt webbing. The moving anchor includes an opening (see FIG. 2) in the material 54 or by a washer or strap 56 (see FIGS. 1 and 6) attached thereto. The system 20 further includes a vehicle mounted external tether guide 70 (which also acts as a force-directing mounting mechanism), which in one embodiment includes a bent rod 72 having the facility to be mounted at either of its ends. For example, the guide 70 may include mounting openings 74a and b, which can be used to secure the guide 70 to the vehicle by fasteners such as threaded bolts. As can be seen, the rod 72 extends through opening or washer 56 such that the moving anchor can slide on the rod 72. As can be appreciated, the system mechanisms, that is, the inflator, the air bag and the guide 70, prior to the accident are hidden from view such as by appropriate automotive trim panels or fascia at or near the adjacent pillars and roof rail.

Reference is made to FIGS. 1a and 1b, which show greater details of the external tether guide 70. The rod 72 includes three sections 72a, 72b and 72c (see FIG. 1a). Sections 72a and 72b are generally mounted at a preferred angle relative to the vehicle structure. In many instances section 72a can be mounted in a generally vertical orientation (θ of about +/−30 degrees) which in some cases will be generally parallel to the major part of the rearmost pillar (which is formed by sheet metal). As shown, Section 72b is at an angle of 15 degrees. As can be seen, sections 72a and 72c angle away from section 72b, which is mounted at or near the level of the window sill.

Reference is made to FIG. 2, which shows the air bag in a deployed condition and shows other features of the system 20. From FIG. 2 we can see the plurality of inflatable chambers 80a and 80b of the air bag, which are separated by a non-inflated section 81. The lower, forward portion of the air bag designated by numeral 82 is connected to an adjacent portion of the vehicle (or to the inflator) through a rotatably mounted (bendable) tether 82a in a known manner. As the air bag is inflated, it breaks through its protective housing (not shown) and moves downwardly parallel to the vehicle side, which as mentioned may include windows 90 and 92, solid portions of the vehicle (or pillars), the vehicle doors, etc. As the air bag inflates, it causes the movable anchor 52 to slide down rod 72.

As can be seen, the apex 76 of rod 72 is positioned such that when the air bag is fully inflated anchor point or anchor 52 (or opening or washer 56) is located at the apex. As is known in the art, as the air bag inflates it will tend to become shorter in the fore-aft direction. This shrinkage or foreshortening of the air bag will generate a force that extends from the front tether to the rod 72. This force, as it acts through the anchor 52 and reacts against the rod 72, will tend to self center the anchor 52 at or near the apex 75. As long as the air bag remains inflated, any tendency to urge, push or otherwise move the air bag upwardly (see force F) is now resisted because of the opposing reaction forces contributed by the bent rod. More particularly, if the air bag is lifted slightly into sections 72a or pulled down to section 72c of the rod, the reaction force acting between the opening or washer 56 and the rod 72 is resolved into a self-centering component of force, which tends to urge the anchor 52 toward the apex 76.

Reference is briefly made to FIG. 1c, which shows a further embodiment of the invention. This figure shows an alternate tether guide or force-directing member 70a, which comprises a bent rod 72', which has a single bend at its apex 76. In FIG. 2a, leg 72a is mounted generally vertically relative to the vehicle with leg 72c angling therefrom (in this embodiment leg 72b is of zero length).

Figure 1D:
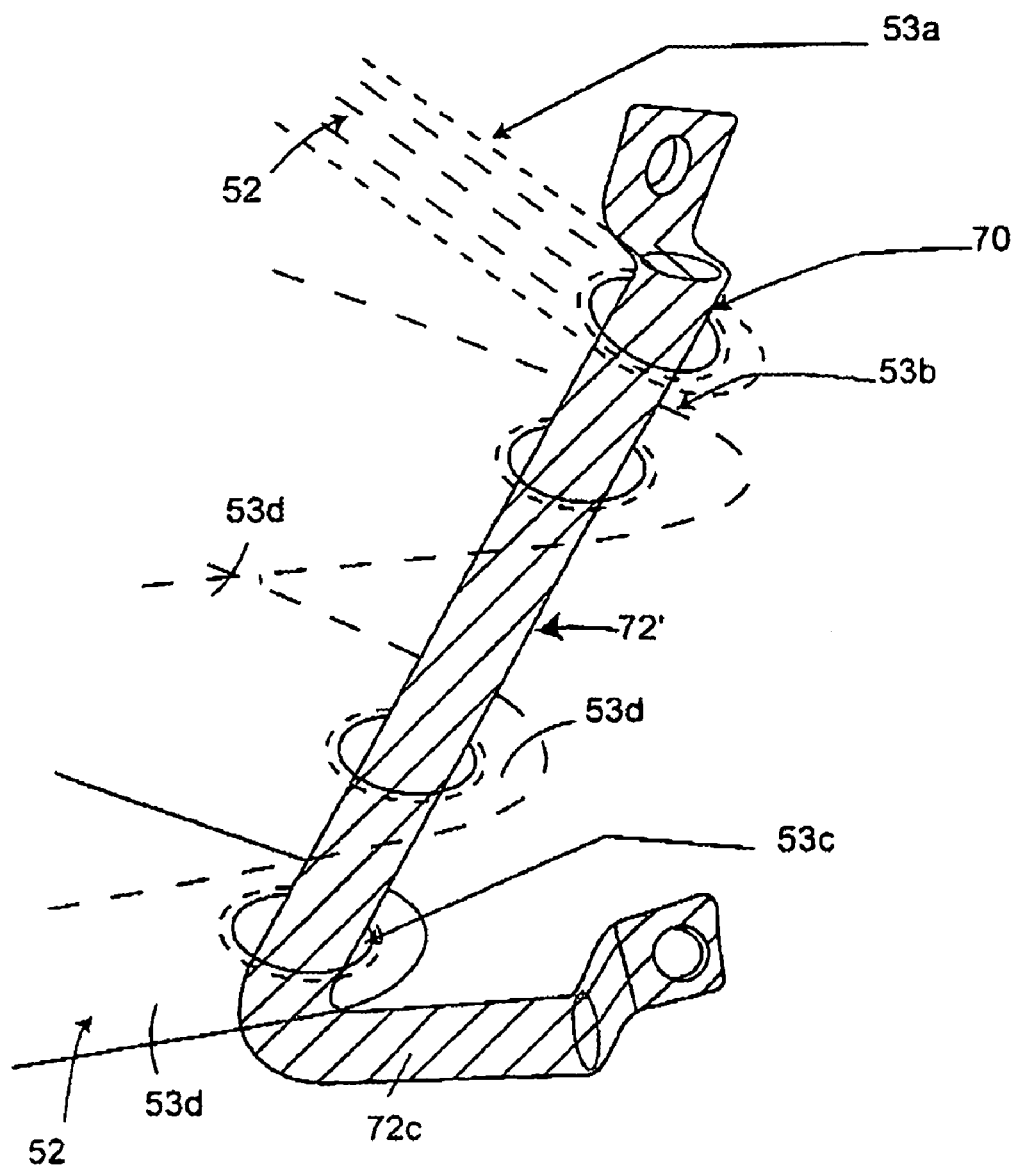

Reference is briefly made to FIG. 1d, which shows another embodiment of the external tether guide. In this embodiment the leg 72c of rod 72' extends horizontally in its mounted in-vehicle orientation. FIG. 1d also shows the progression of movement of tether or anchor 52 from a stowed position (see number 53a) to intermediate positions (see numerals 53b and 53c) to an active position (see number 53d) at the apex of the rod. The movable anchor in the other embodiments will move similarly.

Reference is made to FIG. 3, which shows an alternative embodiment of the invention in which the front tether is replaced by a the combination of second bent rod 72" received within another movable anchor 52a, which is initially positioned near the roof rail and covered by trim. As the air bag inflates the anchor 52a moves down its cooperating rod 72".

Reference is now made to FIG. 4, which shows an alternative embodiment of the invention. Basically, as can be seen, the force-directing mechanism or guide 70 has been replaced by a bent rod 100, which is oppositely oriented relative to the direction of the rods 72 in the earlier figures. As the air bag inflates, the sliding anchor 52 is pulled down the bar below the apex 102. As the air bag continues to inflate, the foreshortening of the air bag will tend to cause the sliding anchor point to try to slide further down the bar 100 (see force F), thereby resisting any force tending to move the air bag upwardly.

After the accident, that is after any of the illustrated air bags have been sufficiently deflated, the occupant can simply lift the air bag upwardly so that he may easily egress from the vehicle.

Figure 5:
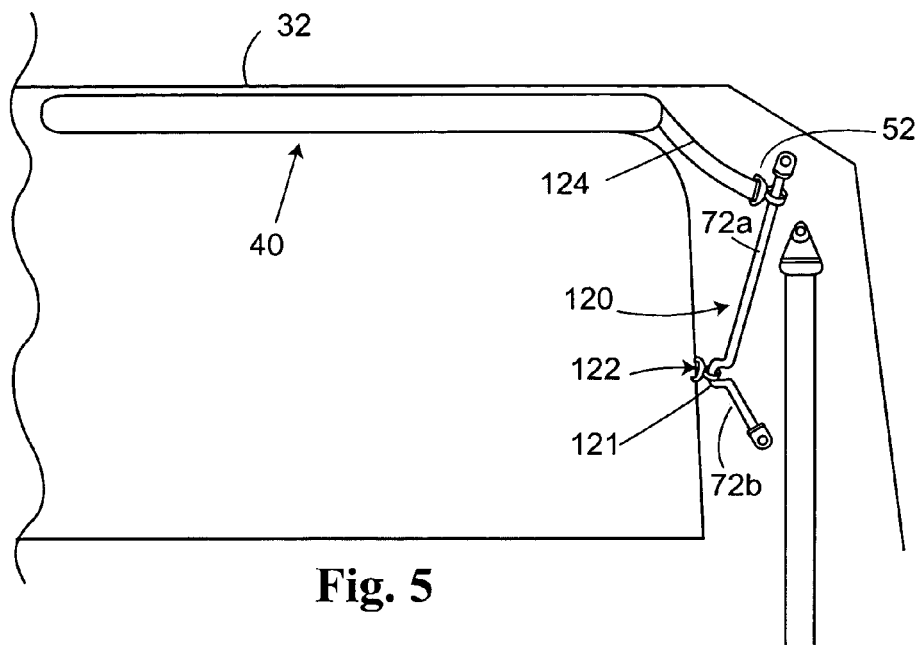
FIGS. 5 and 6 show another embodiment of the invention.
Figure 6:
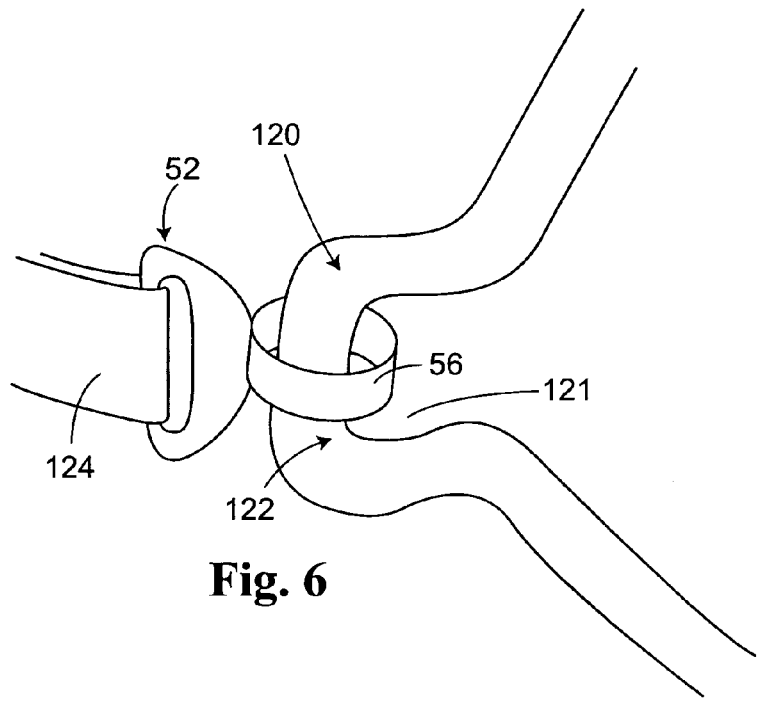

Reference is made to FIGS. 5 and 6, which show another embodiment of the invention. FIG. 5 shows the layout of the air bag 40 in relation to another force-directing member such as bar 120. The bar 120 is similar to many of the bars described above but includes a discontinuity or cup 122 at its apex 121. The apex and discontinuity can be right or left-hand facing. The sliding air bag anchor 52 is formed by a length of webbing 124 such as seat belt webbing sewn to an uninflated portion of the air bag 40. The webbing 124 can be referred to as a tether. A ring or washer 56 is secured to the tether. The angle of bar 120 will cause the ring 56 to slide upon bar 120. Continued movement of the ring will place the ring within the discontinuity or cup 122, which provides for a more positive stoppage or temporary lock or latch. Subsequent to the accident, the ring is easily slid upward. During deployment of the air bag, should the ring slide past the apex, the angle of the bar will insure that the ring returns to the area surrounding the apex of the bar.

Figure 7:
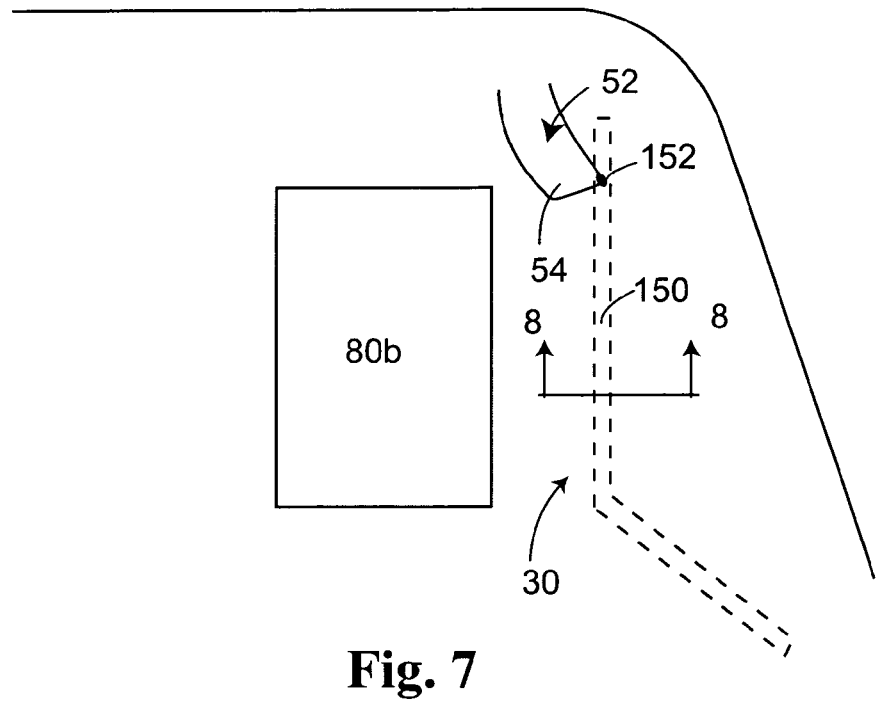
FIGS. 7 and 8 show another embodiment of the invention.
Figure 8:
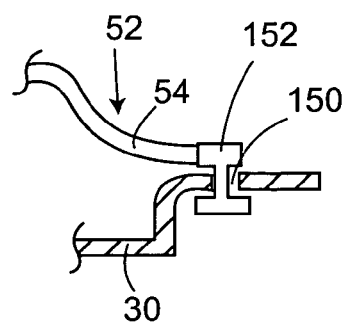

The various rods described in essence define a preferred path for the movable anchor 52. This path or trajectory can be formed in ways other than using a separate rod or bar. For example, FIGS. 7 and 8 show another embodiment of the invention in which the trajectory of any of the above rods can be formed integral to the sheet metal forming the various pillars. The movable anchor 52 in this case can be fashioned with a sliding fastener 152, which slides through the shaped channel 150 formed in the sheet metal of the pillar. This embodiment provides the same functionality but perhaps at cost savings. Additionally, the channel can also be formed to include any of the discontinuities 122.

Many changes and modifications in the above-described embodiment of the invention can, of course, be carried out without departing from the scope thereof. Accordingly, that scope is intended to be limited only by the scope of the appended claims.

The invention claimed is:

1. A side impact air bag curtain apparatus comprising:
   an inflatable air bag adapted to be installed within a vehicle in a stowed condition proximate a roof rail of a vehicle and when inflated expands from the stowed condition to a deployed condition generally in front of an adjacent side of the vehicle;
   the air bag including at least one movable air bag anchor at an end of the air bag; and a force-directing member or guide fixedly mounted at a determinable orientation within the vehicle and adapted to slidingly receive and support the movable air bag anchor, wherein upon inflation of the air bag, the air bag moves to the deployed condition causing the movable anchor to slide down the force-directing member or guide so that upon inflation of the air bag the movable anchor is self located in or near a center of the force-directing member or guide resisting any tendency of the curtain to move or be moved upwardly;

wherein the force-directing member or guide includes an element having a single bend, wherein that single bend forms an apex, the element mounted such that the apex tends to cause the movable air bag anchor to self-center at the apex, while not being locked to the element.

2. The system as defined in claim 1 wherein the element is a rod.

3. A side impact air bag curtain apparatus comprising:

an inflatable air bag adapted to be installed within a vehicle in a stowed condition proximate a roof rail of a vehicle and when inflated expands from the stowed condition to a deployed condition generally in front of an adjacent side of the vehicle;

the air bag including at least one movable air bag anchor at an end of the air bag; and a force-directing member or guide fixedly mounted to the vehicle adjacent one side of the deployed air bag, and adapted to slidingly receive and support the movable air bag anchor, comprising an arcuate bar configured with only a single bend in the bar, the single bend forming an apex, facing the one side of the deployed air bag wherein upon inflation of the air bag, the air bag moves to the deployed condition causing the movable anchor to slide down the bar so that upon inflation of the air bag the movable anchor is self located within the apex of the bar.

4. The system as defined in claim 3 wherein the force-directing member or guide includes an apex directed away from the air bag.

5. The system as defined in claim 3 wherein the bar includes ends which respectively extend angularly away from the apex.

6. The system as defined in claim 3 wherein the bar includes a first portion mounted vertically in the vehicle and a second portion which extends angularly therefrom.

7. The system as defined in claim 3 wherein the bar includes a first portion mounted horizontally in the vehicle and a second portion which extends angularly therefrom and away from the one side of the air bag.

8. The system as defined in claim 3 wherein the bar includes a first portion and a second portion which extend outwardly from the apex and wherein the first and second portions are each skew mounted relative to the vehicle.

* * * * *